(12) United States Patent
Large et al.

(10) Patent No.: US 9,653,044 B2
(45) Date of Patent: May 16, 2017

(54) INTERACTIVE DISPLAY SYSTEM

(71) Applicant: Microsoft Technology Licensing, LLC, Redmond, WA (US)

(72) Inventors: Timothy Andrew Large, Bellevue, WA (US); Steven Bathiche, Kirkland, WA (US); Karlton David Powell, Lake Stevens, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 309 days.

(21) Appl. No.: 14/598,129

(22) Filed: Jan. 15, 2015

(65) Prior Publication Data

US 2015/0235629 A1    Aug. 20, 2015

Related U.S. Application Data

(60) Provisional application No. 61/940,264, filed on Feb. 14, 2014.

(51) Int. Cl.
*G03B 21/60* (2014.01)
*G09G 5/373* (2006.01)
*G06F 3/00* (2006.01)

(52) U.S. Cl.
CPC ............ *G09G 5/373* (2013.01); *G03B 21/60* (2013.01); *G06F 3/005* (2013.01); *G09G 2340/145* (2013.01); *G09G 2358/00* (2013.01); *G09G 2360/10* (2013.01)

(58) Field of Classification Search
CPC .......... G02B 27/01; G09G 5/37; G03B 21/58; G03B 21/60; G03B 35/18; G06F 3/00
See application file for complete search history.

(56) References Cited

U.S. PATENT DOCUMENTS

| 5,621,572 A | 4/1997 | Fergason |
| 6,157,486 A | 12/2000 | Benson, Jr. et al. |
| 6,312,129 B1 | 11/2001 | Sisodia et al. |

(Continued)

FOREIGN PATENT DOCUMENTS

| CN | 1286761 A | 3/2001 |
| CN | 1525539 A | 9/2004 |

(Continued)

OTHER PUBLICATIONS

Rolland, et al., "Development of Head-Mounted Projection Displays for Distributed, Collaborative, Augmented Reality Applications", In Proceedings of Presence: Teleoperators and Virtual Environments, vol. 14, No. 5, Oct. 2005, 22 pages.

(Continued)

*Primary Examiner* — Sultan Chowdhury
*Assistant Examiner* — Danell L Owens
(74) *Attorney, Agent, or Firm* — Alleman Hall Creasman & Tuttle LLP (57) ABSTRACT

A display system comprises a head-mounted projector including an exit aperture and a projection engine to project image light through the exit aperture. The image light is projected onto a retro-reflective display that reflects image light in a first dimension at above 90% efficiency within a 25 degree exit angular spread and reflects image light in the first dimension below 10% efficiency outside of a 35 degree exit angular spread.

20 Claims, 7 Drawing Sheets

(56) References Cited

U.S. PATENT DOCUMENTS

| | | |
|---|---|---|
| 6,381,068 B1 | 4/2002 | Harada et al. |
| 6,796,656 B1 | 9/2004 | Dadourian |
| 8,139,110 B2 | 3/2012 | Nishihara |
| 8,682,030 B2 | 3/2014 | Large et al. |
| 2001/0017731 A1 | 8/2001 | Smith |
| 2002/0126378 A1 | 9/2002 | Cho et al. |
| 2003/0035231 A1 | 2/2003 | Epstein et al. |
| 2004/0079114 A1 | 4/2004 | Aitken et al. |
| 2005/0225687 A1 | 10/2005 | Yamauchi |
| 2007/0064311 A1 | 3/2007 | Park |
| 2008/0013826 A1 | 1/2008 | Hillis et al. |
| 2008/0028325 A1 | 1/2008 | Ferren et al. |
| 2009/0091710 A1 | 4/2009 | Huebner |
| 2009/0116742 A1 | 5/2009 | Nishihara |
| 2009/0219253 A1 | 9/2009 | Izadi et al. |
| 2009/0276734 A1 | 11/2009 | Taylor et al. |
| 2009/0278799 A1 | 11/2009 | Wilson et al. |
| 2009/0278913 A1 | 11/2009 | Rosenfeld et al. |
| 2010/0050133 A1 | 2/2010 | Nishihara et al. |
| 2010/0118397 A1 | 5/2010 | Powell et al. |
| 2010/0281440 A1 | 11/2010 | Underkoffler et al. |
| 2013/0300637 A1* | 11/2013 | Smits .................... G03B 35/18 345/8 |

FOREIGN PATENT DOCUMENTS

| | | |
|---|---|---|
| CN | 1918532 A | 2/2007 |
| JP | 2004252095 A | 9/2004 |

OTHER PUBLICATIONS

Krum, et al., "Augmented Reality using Personal Projection and Retroreflection", In Proceeding of the Personal and Ubiquitous Computing, vol. 16, No. 1, Jan. 2012, 21 pages.

Khalilbeigi, et al., "FoldMe: Interacting with Double-sided Foldable Displays", In Proceedings of the Sixth International Conference on Tangible, Embedded and Embodied Interaction, Feb. 19, 2012, 8 pages.

Huitema, Edzer, "Information Display", Retrieved on: Jan. 16, 2014 Available at: http://informationdisplay.org/IDArchive/2012/FebruaryMarch/FrontlineTechnologyTheFutureofDisplaysIsFo.aspx.

Bharat, "Xpaaand Prototype Rollable Display is Future of Mobile Displays", Retrieved on: Jan. 16, 2014 Available at: http://www.damngeeky.com/2013/07/01/12226/xpaaand-prototype-rollable-display-is-future-of-mobile-displays.html.

"Video Projection", Retrieved on: Jan. 16, 2014 Available at: http://www.prosoundcanada.com/video_projection.html.

Eldes, et al., "Multi-View Autostereoscopic Projection Display using Rotating Screen", In the Optical Express, vol. 21, Issue 23, Nov. 2013, 12 pages.

Izadi, et al., "C-Slate: A Multi-Touch and Object Recognition System for Remote Collaboration using Horizontal Surfaces", In Proceedings of the Second Annual IEEE International Workshop on Horizontal Interactive Human-Computer Systems (Tabletop), Oct. 2007, 8 pages.

Coldefy, et al., "Digitable: An Interactive Multiuser Table for Collocated and Remote Collaboration Enabling Remote Gesture Visualization", In IEEE Conference on Computer Vision and Pattern Recognition, Jun. 17, 2007, 8 pages.

Phillips, et al., "Links between Holography and Lithography", In Fifth International Symposium on Display Holography, Feb. 1995, 9 pages.

Agarwal, et al., "High Precision Multi-touch Sensing on Surfaces using Overhead Cameras", In Proceedings of IEEE International Workshop on Horizontal Interactive Human-Computer Systems, Oct. 10, 2007, 4 pages.

Izadi, et al., "Going Beyond the Display: A Surface Technology with an Electronically Switchable Diffuser", Retrieved at << http://research.microsoft.com/en-us/um/people/shodges/papers/secondlight_cr3.pdf >>, Proceedings of the 21st annual ACM symposium on User interface software and technology, Oct. 19-22, 2008, pp. 10.

Walker, et al., "Beneath the Surface", Retrieved at << http://www.walkermobile.com/March_2010_ID_Beneath_the_Surface.pdf >>, 2010, p. 32-34.

"Projection screen", Retrieved at << http://www.absoluteastronomy.com/topics/Projection_screen >>, Jul. 12, 2010, pp. 4.

State Intellectual Property Office of China, Office Action of Chinese Patent Application No. 201110285487.9, Oct. 8, 2013, 10 pages.

"International Search Report", Mailed Date: May 17, 2012, Application No. PCT/US2011/051141, Filed Date: Sep. 11, 2011, pp. 9.

ISA European Patent Office, International Search Report and Written Opinion issued in Patent Application No. PCT/US2015/013428, Apr. 9, 2015, Netherlands, 11 Pages.

IPEA European Patent Office, International Preliminary Report on Patentability Issued in Application No. PCT/US2015/013428, Feb. 29, 2016, WIPO, 10 pages.

European Patent Office, "Communication pursuant to Rules 161(1) and 162 EPC Issued in European Patent Application No. 15703698.9," Sep. 21, 2016, Germany, 2 Pages.

* cited by examiner

INTERACTIVE DISPLAY SYSTEM

CROSS-REFERENCE TO RELATED APPLICATIONS

This application claims priority to U.S. Provisional Application No. 61/940,264, filed Feb. 14, 2014 and entitled "INTERACTIVE DISPLAY SYSTEM," the complete contents of which are hereby incorporated herein by reference for all purposes.

BACKGROUND

Portable computing devices limit the size and resolution of display screens in order to maintain portability. Users operating portable computing devices in public spaces may desire a display screen with a privacy function to limit the field of view of images on the display.

DETAILED DESCRIPTION

It is desirable to have a portable computing system that is capable of showing a large area display, but without having to carry a large device. One way of creating a large display from a small device is to use a virtual display such as a head-mounted display. However, such devices must be worn like a pair of spectacles, and many people already wear spectacles. The device thus has to accommodate personal ophthalmic correction. Further, the display is optically overlaid on the scene, requiring the display images to be uncomfortably bright in order to "over-write" the real world, or the glasses need to be darkened, thus limiting the user's vision. The resolution of the display must also be very high in order to project a high resolution image while simultaneously stabilizing the image against head movements. For certain applications, complex sensors and algorithms are required to stabilize the image at a point in space, where no physical marker exists at that point. Another alternative is to use a foldable emissive display. However, current technology allows LCDs and OLEDs to be bent only by a limited amount, and typically only once (e.g. to fit within a curved housing).

In many situations it is further desirable to have a display device with a privacy function, which prevents people near the user from viewing their work or confidential documents. Such privacy functions are currently achieved using a removable screen which contains venetian blind structures to limit the field of view of the display. Such a screen may also have an enhanced reflectivity at off-axis view angles to further reduce the screen visibility to individuals other than the primary user.

This description relates to a head-mounted display system comprising a projection engine, which may be used to project an image onto a retro-reflective display, such that the image is seen by the user wearing the computing system, but is not clearly visible to other nearby individuals. The retro-reflective display may be foldable, allowing for portability. The head-mounted display may include a frame which mounts an exit aperture of the projection horizontal to a user's eyes (e.g., to the right of a right eye or to the left of a left eye in the same horizontal plane as both eyes). The head-mounted display may include an optical stabilization subsystem to maintain projected images within the boundaries of the retro-reflective display. Movement of the display within a field of projection of the projection engine may be compensated for by adjusting auto-cropping of the field of projection. Movement of the display outside of the field of projection may be compensated for by adjusting a projection direction of the projection engine.

Figure 1:
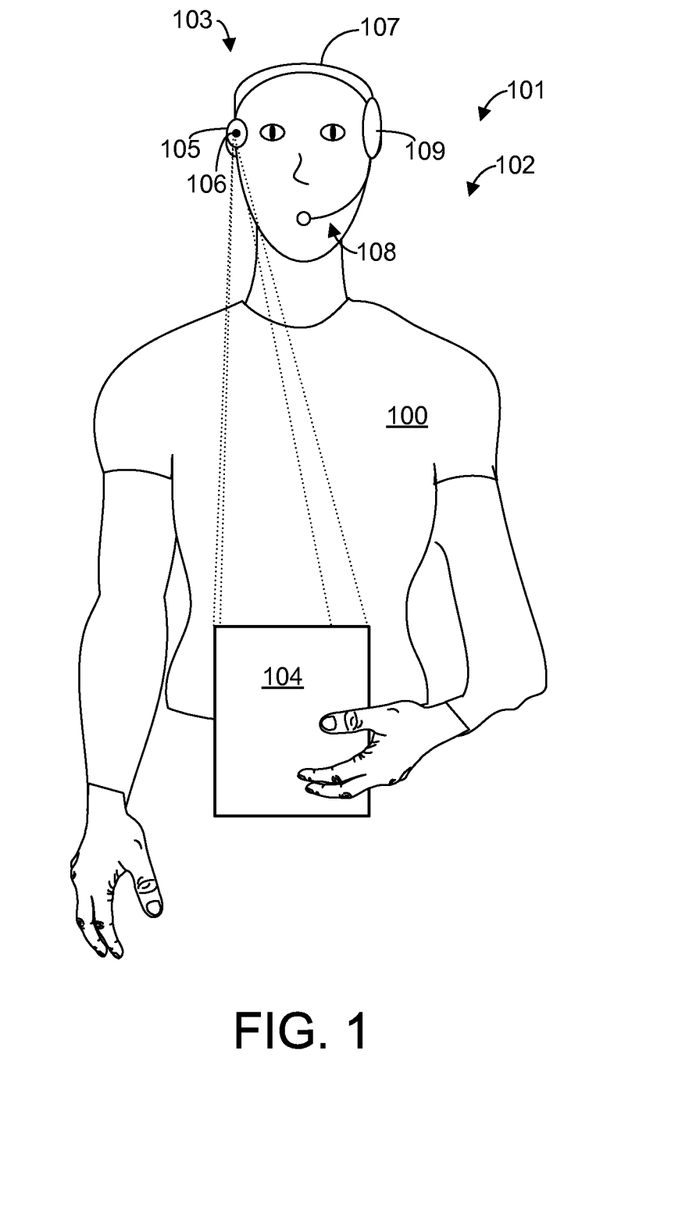
FIG. 1 shows a user wearing a head-mounted projector and holding a retro-reflective display.

FIG. 1 shows a user 100 interacting with a computing system 101. Computing system 101 includes display system 102. Display system 102 includes head-mounted projector 103 and retro-reflective display 104. Head-mounted projector 103 may include projection engine 105 which projects image light onto retro-reflective display 104 via exit aperture 106. A frame 107 may secure head-mounted projector 103 to the head of user 100. In this example, frame 107 imparts a headphone-type form factor, although other form factors may be utilized. Computing system 101 may further include one or more cameras, for example a stereo camera pair (not shown). Computing system 101 may further include one or more infra-red LEDs (not shown), an audio input 108 (e.g. a microphone), and an audio output 109, such as headphones or a bone-conduction audio system. The one or more cameras, one or more infra-red LEDs, audio input 108 and audio output 109 may be coupled to frame 107. Computing system 101 may additionally have other wireless input systems, such as a Bluetooth transceiver, in order to enable the use of additional input devices, such as a trackpad, keyboard, mouse, etc. Such input devices may be included in or coupled to head-mounted projector 103, retro-reflective display 104, or may be separate peripheral devices. Computing system 101 may further include a communications device (not shown) for connecting with the internet, for example. The communications device may be a cellular or WiFi transceiver or similar device.

As shown in FIG. 1, projection engine 105 may be mounted such that exit aperture 106 is near one eye of user 100, but does not obscure the vision of user 100. Projection engine 105 may be mounted to one side of head-mounted projector 103. For example, the projector may be placed on the left-hand side for a right-handed user in order to minimize the effect of shadows on the projected image. This may provide an advantage in that the projected image hits the screen at an incident angle that may be reflected back in a small rectangular or oval-shaped eye box corresponding to the eyes of user 100. This is more efficient than similar systems using a top mounted or head-lamp style projection engine, in that such projection engines may require light to be reflected back in a circular or triangular viewing window, thereby losing image intensity. Further, placing projection engine 105 and thus exit aperture 106 on the side of user 100's head, in combination with retro-reflective display 104 allows for the use of computing system 101 without additional eye-wear. Exit aperture 106 may thus be located horizontally to an outside of the user's eyes (e.g., to the right of the right eye or to the left of the left eye), rather than between the eyes, or on the forehead above the space between the user's eyes.

Projection engine 105 may be a laser scanner based engine, DLP (micro-mirror) engine, LCOS (liquid crystal on silicon) or other suitable projection engine. Laser projection engines are advantageous in that such projection engines can be manufactured in a relatively small package while retaining a relatively large depth of focus.

Retro-reflective display 104 may be a foldable display. In this way, a user may carry a relatively small (e.g. pocket sized) display that may be expanded into a significantly larger display size. Retro-reflective display 104 may be designed so that multiple display sizes can be used depending on the user's preference, available space, etc. For example, a display may have a maximum size of 7" by 10", but also be usable when folded in half to form a 5" by 7" screen. In some examples, the display may be flexible when in a storage-form factor, and stiffened when in an active-form factor. For example, a rollable display may be stiffened in a manner akin to a rollable tape measure. The display may have a rigidity imparted to it through a twisting of the display. The display may be tiled, where the tiles have an initial rigidity and, when folded, provide self-bracing, for example through partial overlaps. The display may be configured with an active-form factor rigidity such that the display can be held by one hand, in a similar manner to a tablet computer. The display may be configured to be coupled to a stand, such that the display may be viewed in a manner akin to a desktop display screen. In some examples, the retro-reflective display may have minimal rigidity (e.g. similar to a handkerchief) while being configured to mount on a foldable stand that provides rigidity. A hinged frame may also be used to provide rigidity to the retro-reflective display. The frame may unfold or telescope into a rectangle with hinges in the center of two opposite sides. The retro-reflective display may be clipped or attached to the hinged frame in a manner such the frame/display combination appears like a newspaper or book with a fold or spine down the center.

Figure 2:
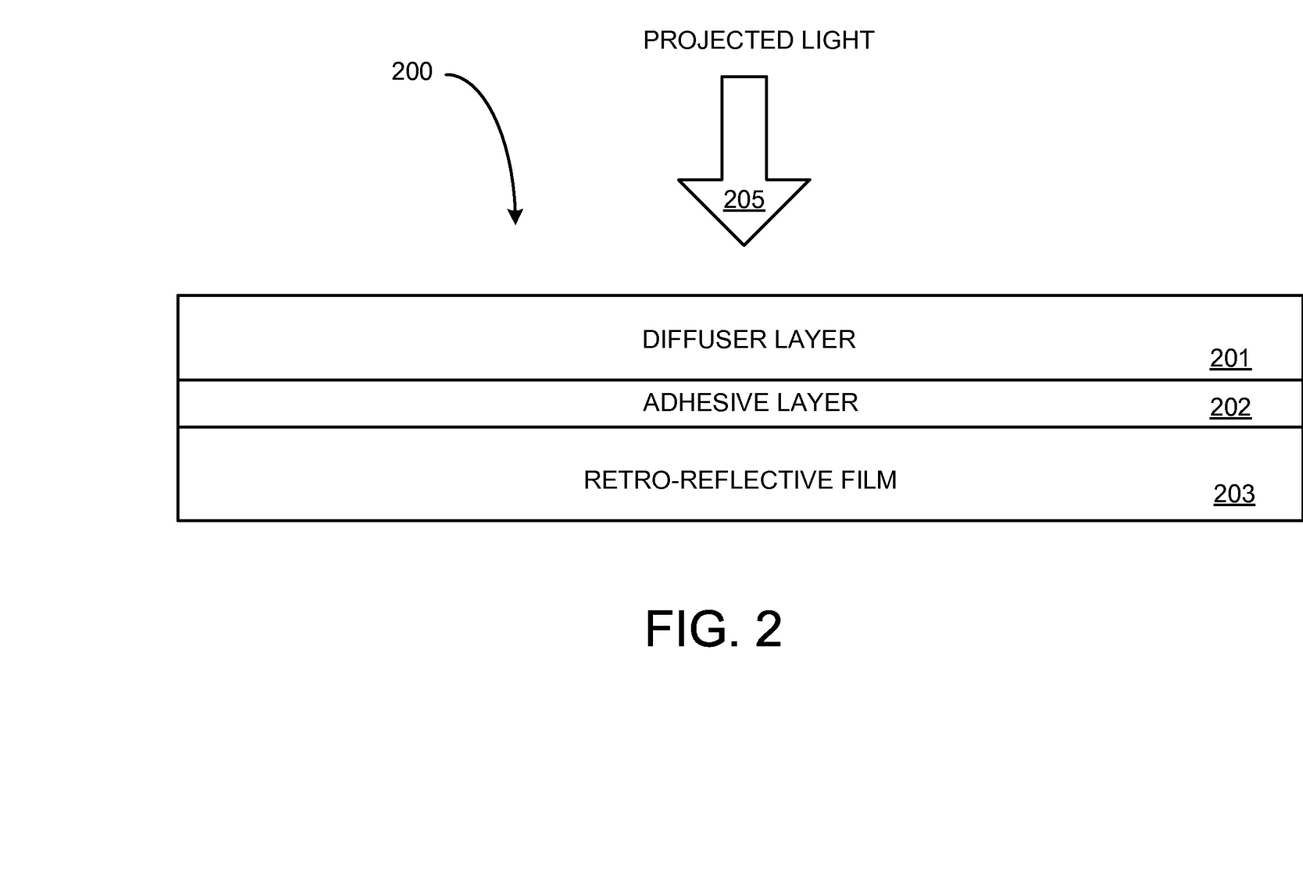
FIG. 2 schematically shows an example retro-reflective display.

FIG. 2 shows a schematic diagram of an example retro-reflective display 200. Retro-reflective display 200 may include a diffuser layer 201, an adhesive layer 202, and a retro-reflective film 203. Retro-reflective display 200 may be used to reflect an image from a projection engine such that the image is returned to a region surrounding the eyes of the user wearing head-mounted projector 103, but in a manner that does not send light elsewhere.

In one example, retro-reflective film consists of a diamond-shaped ruled surface. The periodicity of the structure may be on the order of 120 μm, but larger or smaller structures may also be used. A typical retro-reflector returns light to the region of the source, but some light is diffracted or scattered by prism imperfections. In so-called "conspicuity" products, such as those used on safety equipment and signs, retro-reflectors are deliberately de-tuned by designing with non-ideal dihedral angles. However, in order for the images displayed on retro-reflective display 200 to appear uniform to both eyes of the user, diffuser layer 201 may be placed over the retro-reflective film 203. Diffuser layer 201 may be coupled to retro-reflective film 203 via an appropriate adhesive layer 202, provided that the adhesive layer imparts little optical interference.

Diffuser layer 201 may comprise a graded index (GRIN) diffuser. A graded index diffuser may impart a top-hat type diffusion profile. This may be achieved by providing an internal diffuser structure similar to a fiber optic faceplate, with columnar regions of high refractive index separated by regions of low refractive index. Light rays entering the diffuser layer that are close in angle to the columnar axis angle are guided by the structure, and are multiply reflected, and thereby scattered over a cone. The cone angle is defined to a first order by the difference between the input angle and the columnar axis angle. Light rays entering the diffuser layer that are at a steeper angle relative to the columnar axis angle are not guided by the structure, and pass through undeviated. In this way, the diffuser scatters light incident within a certain angular range, but does not scatter light outside this range. The range of angles scattered may be displaced from the layer normal by creation of an off-axis columnar structure. Such structures may be made by self-assembly or photo-lithographic techniques in photopolymer materials.

Using a graded index diffuser may allow for light to be diffused within the acceptance cone of the diffuser, but not outside of it. Consequently, projected light 205 is diffused through diffuser layer 201, retro-reflected back to the diffuser by retro-reflective film 203, and then re-diffused through diffuser layer 201, while still remaining inside the diffusion angle of diffuser layer 201.

In contrast, by solely using a retro-reflective film, light is reflected back to the source along the incident angle. For the user, only light scattered from the retro-reflector would be seen by the eyes, as truly retro-reflected light is sent back to the projector. The eye nearest the projector would see a dim image. The image would be even dimmer in the other eye. Retro-reflective display 200 allows for light originating at the projection engine to be retro-reflected back so that the same image appears to both eyes. By using a graded index type diffuser with a top-hat type diffusion profile, light may be returned to the eyes of the user in a rectangular or oval-shaped eye box without otherwise wasting or scattering light. This provides the reflected image with uniform brightness and appearance. In contrast, other diffuser types may reflect an image that appears brighter to one eye than the other. A diffuser with a bell-shaped diffusion profile could be used to reflect light equally back to both eyes, but this may require a significantly wider image box, causing a loss of image brightness and image contrast, while increasing the amount of light reflected elsewhere, thereby decreasing viewing privacy.

The use of a controlled graded index diffuser allows for the creation of an offset angle. In this way, the projection engine can be placed on one side of head-mounted projector 103, and the image reflection is biased accordingly such that the image is returned to the both eyes of the user uniformly.

While graded index diffusers may be used in some examples of the retro-reflective display, other diffuser types may also be used where appropriate. For example, surface relief diffusers may provide some cost savings, allowing for an inexpensive display. However, the images projected via the graded index diffuser shows a reduction in speckling with a low impact on resolution when compared to the surface relief diffuser. This may be due to the mixing properties of light guided by the graded index diffuser. In particular, green light has a significant reduction in speckling.

For surface relief diffusers, speckling may be reduced by increasing the thickness of the surface relief substrate. However, this may be accompanied by a corresponding increase in spot-growth, and thus an overall decrease in resolution (due to a decrease in modulation transfer function) as compared to examples using a graded index diffuser. However, for the graded index diffuser, an increase in thickness has less of an impact on spot growth. As such, speckling may be reduced without sacrificing resolution.

Figure 3A:
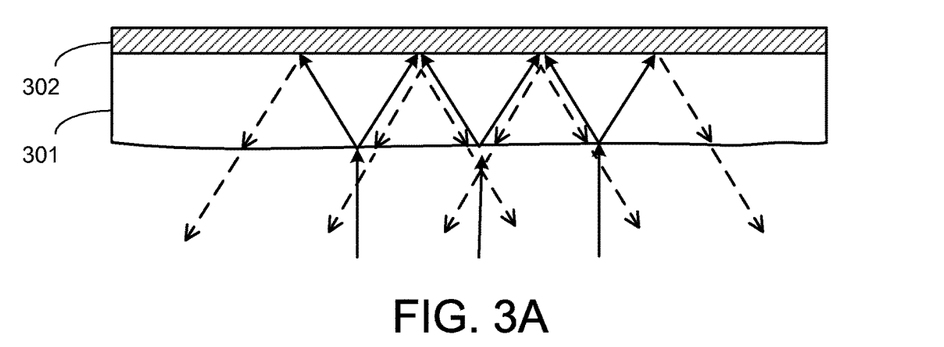
FIG. 3A shows a schematic depiction of a surface relief diffuser laminated on a reflector.
Figure 3B:
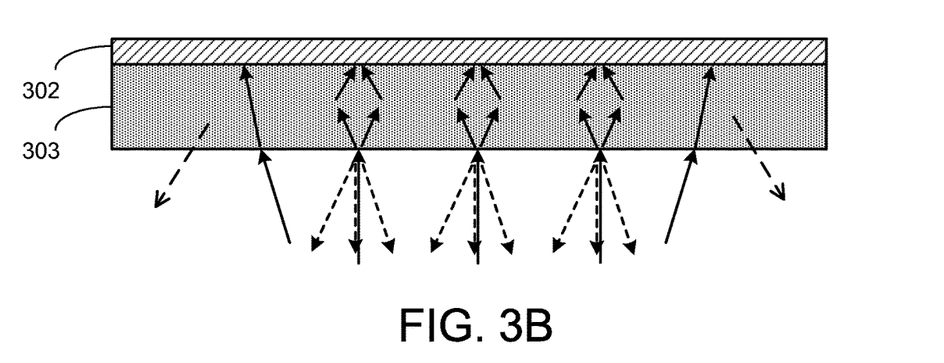
FIG. 3B shows a schematic depiction of a graded index diffuser laminated on a reflector.
Figure 3C:
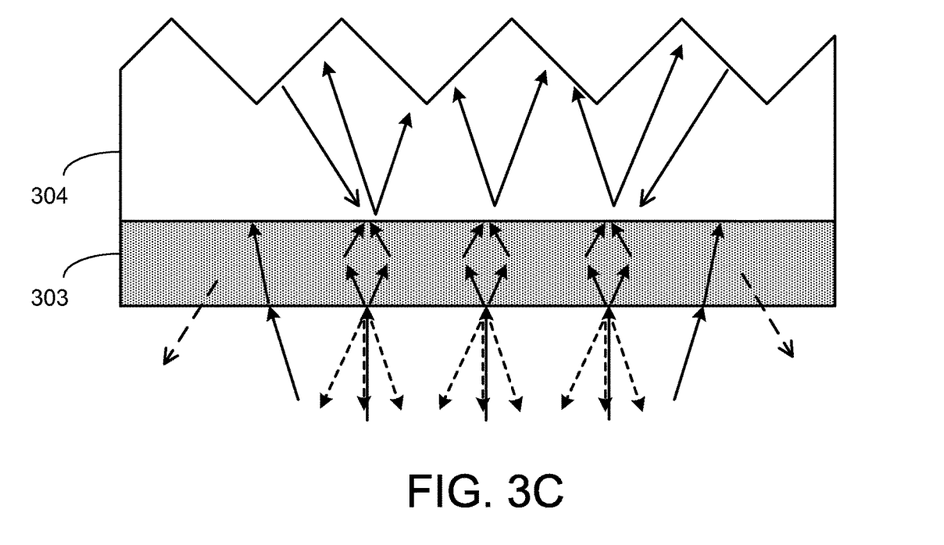
FIG. 3C shows a schematic depiction of a surface relief diffuser laminated on a retro-reflector.

This concept is further illustrated in FIGS. 3A-3C. FIG. 3A shows a schematic depiction of a surface relief diffuser 301 laminated to a reflector surface 302. Projected input light suffers from spot growth due to diffuse angular strength and substrate thickness. Surface relief diffuser 301 yields a larger apparent spot size upon the second pass of the (reflected) input light, dictating a more angularly dense speckle pattern. The speckle pattern is thus subject to additional averaging for a given eye pupil size. In this way, speckle contrast may be reduced, but at the expense of resolution.

FIG. 3B shows a schematic depiction of a graded index diffuser 303 laminated to a reflector surface 302. In contrast to the configuration depicted in FIG. 3A, projected light input within the acceptance angle of the graded index diffuser is guided and then diffused homogenously. The apparent spot size is not increased.

FIG. 3C shows a schematic depiction of a graded index diffuser 303 laminated to a retro-reflective film 304. Changing the flat reflector of FIG. 3B to a retro-reflective array layer enables light within the acceptance angle of the diffuser to be guided, retro-reflected, and then homogenously diffused in one dimension, while the light is substantially retro-reflected in the orthogonal dimension. As such, this configuration allows the combination of one-dimensionally homogenized diffuse output in the horizontal dimension, while substantially maintaining retro-reflection output pointing in the vertical dimension. In turn, this enables visibility and uniformity of image content in the horizontal dimension, and further allows for a significant increase in efficiency (e.g. a reduced power requirement) in the vertical dimension, while simultaneously reducing speckle contrast. A slight angular spread may be added in the vertical dimension by adding a graded index diffusion layer comprising index gratings which diffuse a small angular spread in the vertical dimension to account for the alignment of the eye axis level with the projection output level in the vertical dimension.

Figure 4A:
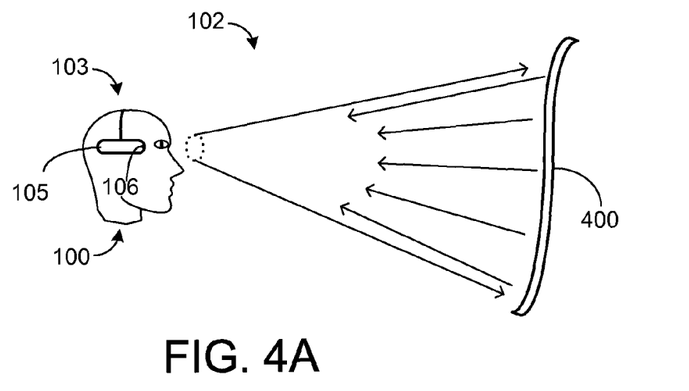
FIG. 4A shows a schematic depiction of a side view for the head-mounted projector and retro-reflective display.
Figure 4B:
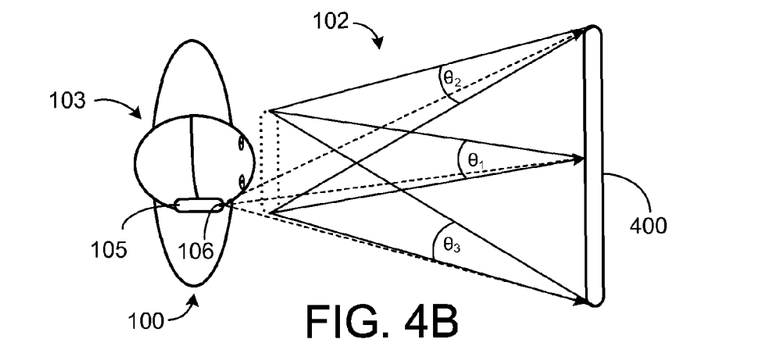
FIG. 4B shows a schematic depiction of a top-down view for the head-mounted projector and retro-reflective display.

FIGS. 4A and 4B schematically show an example side view and an example top-down view, respectively, that may be used for the formation of an efficient partially retro-reflected eye box. In the side view depicted in FIG. 4A, head-mounted projector 103 is configured so exit aperture 106 of projection engine 105 is aligned vertically with the eyes of user 100. The light returned along the vertical axis is substantially retro-reflected. In this way, the vertical return is independent of the flatness of retro-reflective display 400. In some examples, this may be accomplished using a substantially one-dimensional surface relief diffuser as a diffuser layer. In this way, the horizontal axis may exploit the diffuser layer and the retro-reflective film, while the vertical axis may be retro-reflective only, or slightly exploit the diffuser layer and the retro-reflective film. In other words, retro-reflective display 400 may diffuse light in a first dimension, and substantially retro-reflect image light without diffusion in a second dimension, perpendicular to the first dimension. In such examples, retro-reflective display 400 may have an inherent vertical/horizontal orientation.

In the top-down view depicted in FIG. 4B, exit aperture 106 of projection engine 105 is adjacent to the eyes of user 100 along the horizontal axis. In order for light from projection engine 105 to return to the user's eyes after reflecting off of retro-reflective display 400, the exit angular spread along the horizontal axis of the display may include at least the aperture of projection engine 105 and both eyes of the user.

To facilitate this configuration, the screen output cone may be telecentric. This enables the display to emit the same cone vs position horizontally across display 400. For example, as shown in FIG. 4B, the exit angular spreads $\theta_1$, $\theta_2$, and $\theta_3$ may be equal in value. By using a diffuser with top-hat style characteristics, the reflection efficiency of the retro-reflective display may be significantly higher within the eyebox, as compared to outside the eyebox. For example, the retro-reflective display may reflect image light in a first dimension at above 90% efficiency within a 25 degree exit angular spread and reflects image light in the first dimension below 10% efficiency outside of a 35 degree exit angular spread.

Alternatively, the screen output cone may be tailored vs position by using a graded index or holographic diffuser. In this configuration, efficiency may be improved by tailoring the tilt of the acceptance pointing angle vs position across retro-reflective display 400. For example, the exit angular spreads $\theta_1$, $\theta_2$, and $\theta_3$ may have unique values. This in turn, may allow for both the directing of the eyebox to a common locus, and a reduction in eyebox width, thereby increasing security and efficiency.

Figure 4C:
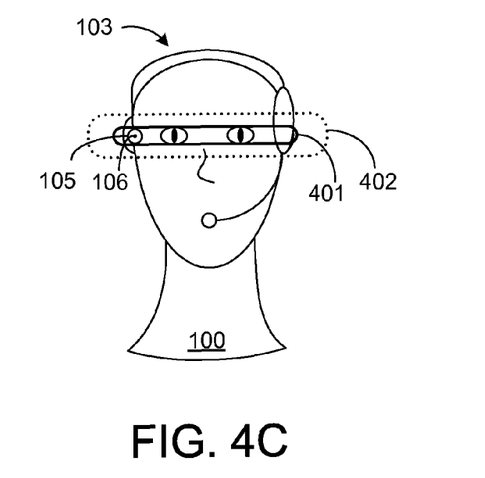
FIG. 4C shows a user wearing a head-mounted projector.

FIG. 4C shows a schematic depiction of a user wearing head-mounted projector 103. Box 401 represents an exit cone angular spread for the diffuser and retro-reflective layer. In order for light emitted from projection engine 105 to retro-reflect back to the eyes of user 100, the minimum exit cone angular size may include exit aperture 106 as well as both eyes of user 100. The exit aperture may be located within both the acceptance and diffuse exit angular spread of the display return accounting for the distance of the screen from the eyes of user 100. Box 402 represents an angular spread that may be added to the exit cone angular size. By increasing the exit cone angular size vertically, viewer eye and/or head tilt relative to the screen orientation may be accounted for in scenarios where the eye and/or head tilt is greater than that which would be allowed by the conspicuity angle of the retro-reflective display itself. In this way, the user will perceive little to no movement of images reflected off of retro-reflective display 400, even as the user's eyes and/or head tilt toward or away from the screen.

Projection engine 105 may be coupled to an optical stabilization subsystem allowing for images projected by the projection engine to be maintained on the retro-reflective display despite movements of the user and/or the display. The optical stabilization subsystem may determine characteristics of the retro-reflective display, such as size, shape, orientation, distance from the projection engine, etc. For example, computing system 101 may include one or more infra-red LEDs and one or more cameras which may be used to provide feedback about both the user's actions and movements as well as information related to the screen's location in space. Light from the LEDs (along with light projected from projection engine 105) is returned to the cameras by the retro-reflective display. In some embodiments, the LEDs may be pulsed and the camera shutter synchronized accordingly to help eliminate any interfering ambient light. The LEDs and the one or more cameras may be coupled to head-mounted projector 103 such that they fall within the exit angular spread for the diffuser and retro-reflective layer. In this way, the LEDs and one or more cameras will fall within the minimum acceptance and output of the retro-reflective display. For examples where the one or more cameras are configured to only detect IR light, the camera may be placed outside the exit angular spread and still receive retro-reflected IR (e.g. IR within the conspicuity angle of retro-reflective film, but outside of the acceptance of the diffuser).

This data may be used to determine both the position of the screen as well as any objects therein between (such as hands, fingers, stylus, etc.). The retro-reflective display will appear bright as seen by the camera, while incident objects and the background will appear black. This allows for a high contrast image including an outline of the display that may be used to target the projection engine via the optical stabilizing system.

This allows for the size of the projected image to be matched to the size of the retro-reflective display, rather than to projecting a large image and selecting a small area within the field for the active display. In this way, a high resolution image may appear to the user without requiring an extremely high resolution projection engine. The projection engine may project images within a field of projection that is larger in area than the retro-reflective display. The projection engine may then auto-crop the field of projection to avoid projecting outside boundaries of the retro-reflective display. For example, the optical stabilization subsystem may be configured to determine a size of the retro-reflective display based on the boundaries of the retro-reflective display, and further configured to adjust auto-cropping of the field of projection based on the size of the retro-reflective display. The optical stabilization subsystem may further be configured to adjust the auto-cropping of the field of projection responsive to the retro-reflective display moving within the field of projection. In this way, rapid, small (e.g. below a threshold of 2 seconds and/or 5 centimeters) movements of the display and/or the head mounted projector may be accounted for over a short time scale.

Figure 5:
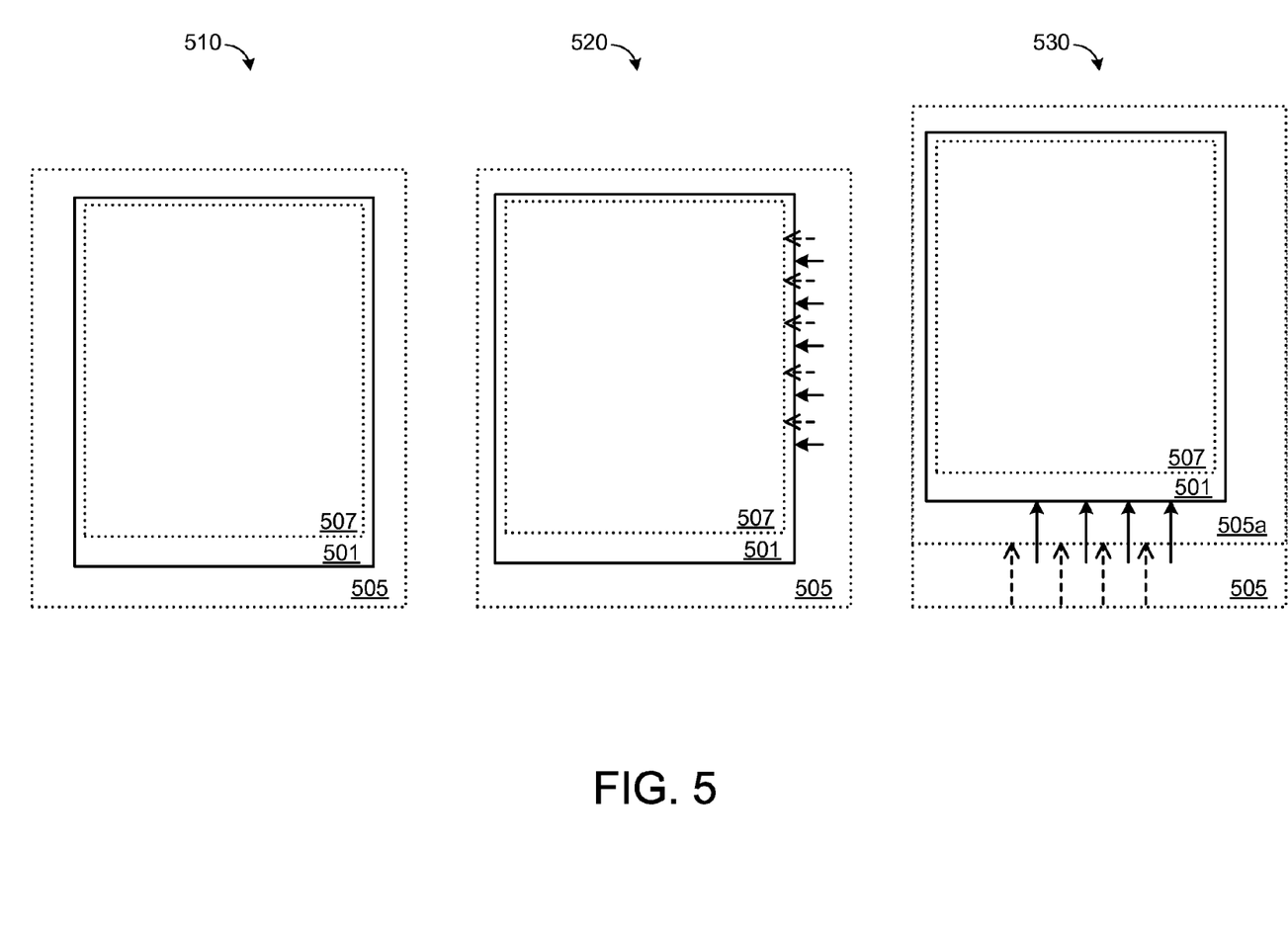
FIG. 5 schematically shows the adjusting of projected images responsive to movement of the retro-reflective display.

For example, FIG. 5 schematically shows an example retro-reflective display 501. A projection engine (not shown) has a field of projection 505, including a projected image 507. At 510, retro-reflective display 501 is located within field of projection 505. Projected image 507 is auto-cropped within field of projection 505 so that the projected image is contained within the boundaries of retro-reflective display 501. At 520, retro-reflective display 501 moves within the boundaries of field of projection 505. Accordingly, the auto-cropping of projected image 507 is adjusted, so that the projected image remains within the boundaries of retro-reflective display 501.

The optical stabilization subsystem may be further configured to adjust a projection direction of the projection engine by physically moving the projection engine relative to the retro-reflective display responsive to the retro-reflective display moving outside of the field of projection. For example, the projection engine may be mounted on a steering mechanism that allows the projection engine to project an image onto the display even as the user's head moves. In some embodiments, the projection engine may be mounted on a small rotational motor, such as a piezo-electrically actuated motor. In this way, larger movements of the display and/or projection engine (e.g. above a threshold) may be accounted for by controlling the direction of the projection engine. The projected image may thus be moved quickly so that the user does not detect significant movement of the image relative to the retro-reflective display.

Returning to FIG. 5, at 530, retro-reflective display 501 moves such that the top boundary of the display moves outside the boundaries of field of projection 505. Accordingly, the position of the projection engine is adjusted, thereby moving the field of projection (505a). The auto-cropping of projected image 507 is adjusted within field of projection 505a, so that the projected image remains within the boundaries of retro-reflective display 501.

In an example control system for an optical stabilization subsystem, two control loops operate, one at a higher speed the other at a slower speed. An image from the cameras is used to determine the position of the retro-reflective display in space. A first control loop modifies the projected image size, keystone, and position to lock the position of the projected image onto the screen. The image offset is used as input to the second control loop, where the mechanical pointing direction of the head-mounted projector is modified in order to minimize the image offset. In this way rapid movements are controlled electronically by auto-cropping the projected image at high speed, and slower movements are mechanically corrected by re-pointing the projector.

In examples where the head-mounted projector includes one or more cameras and one or more IR-LEDs, the head mounted projector may further include an input subsystem to determine the position of one or more occluding objects on or near the retro-reflective display based on IR light received by one or more cameras. The determined position (s) may be used to mask the one or more occluding objects from the projected image. This produces the illusion that the image is generated from the retro-reflective display, rather than being projected from in front. The light received at the cameras can further be used to determine gestures, hovering, touch, pen movements, etc. which may in turn, be used to control the operation of a computing system communicatively coupled to the display system.

Figure 6:
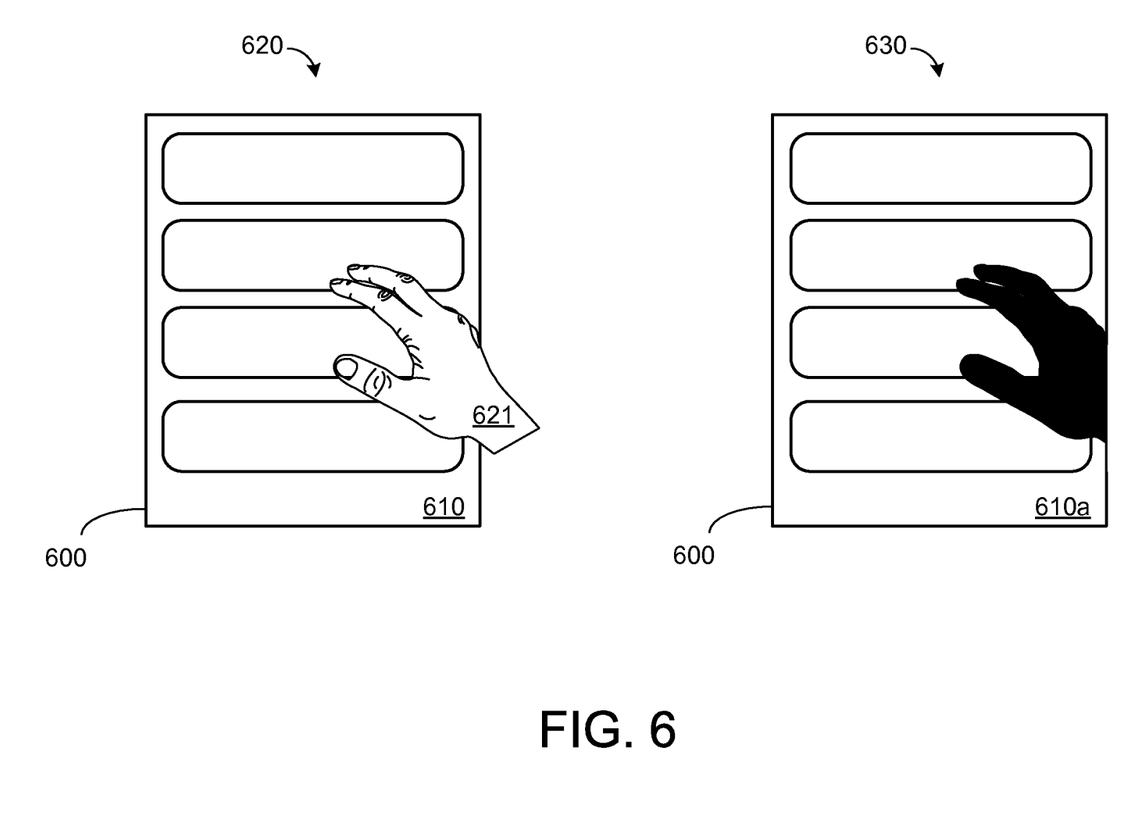
FIG. 6 schematically shows the adjusting of projected images based on the location of occluding objects.

For example, FIG. 6 depicts a retro-reflective display 600, upon which image 610 is projected. At 620, a user's hand 621 is shown occluding a portion of image 610. Hand 621 may appear in the camera as a silhouette on the retro-reflective display. The boundaries of the hand may be mapped relative to the display boundaries and the projected image. The portion of image 610 occluded by user's hand 621 may then be altered so as to mask the hand from the image. At 630, an altered image 610a is shown projected onto retro-reflective display 600. In this example, rather than projecting portions of image 610 onto the user's hand, where they may be seen by other individuals in the user's vicinity, the occluded portions of the image are masked in projected image 610a. Depth cameras and/or stereo-camera pairs may be used to determine the three-dimensional position of occluding objects relative to the retro-reflective display, and thus form the basis for touch and/or hover based inputs.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
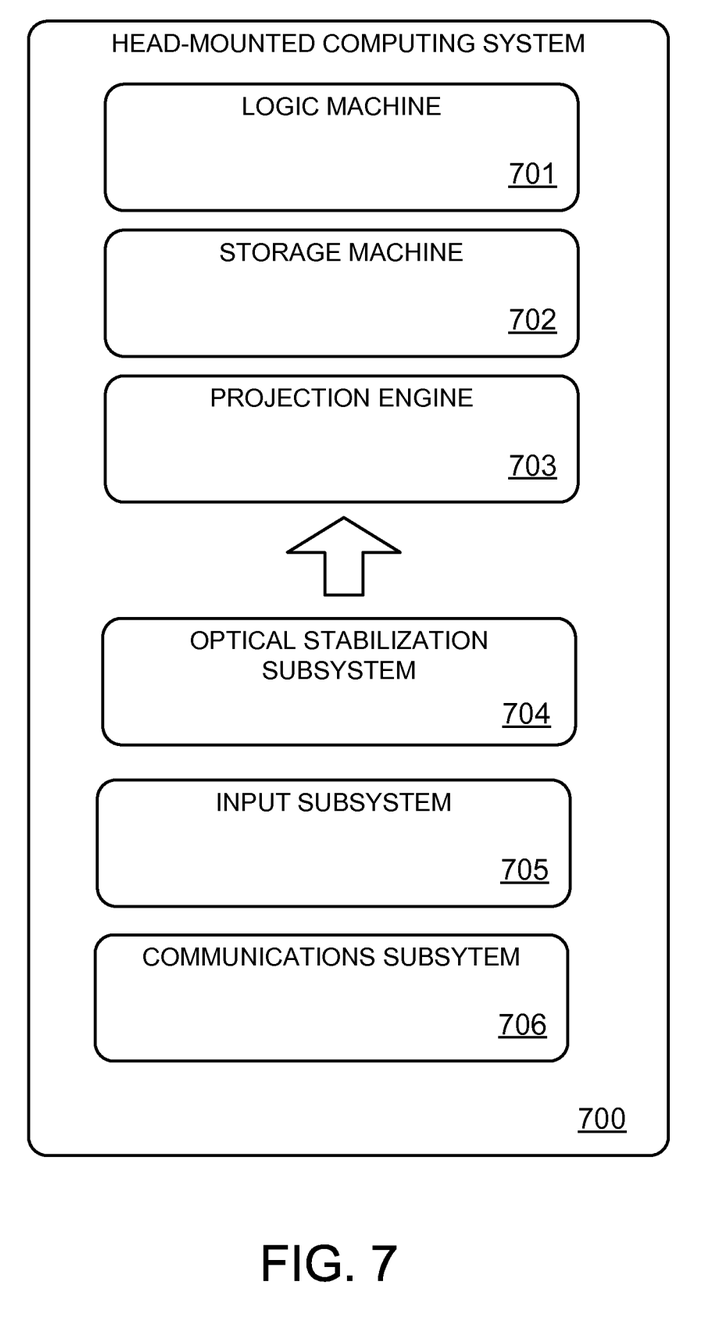
FIG. 7 schematically shows a computing system in accordance with the present disclosure.

FIG. 7 schematically shows a non-limiting embodiment of a computing system 700 that can enact one or more of the methods and processes described above. Computing system 700 is shown in simplified form. Computing system 700 may be incorporated with a head-mounted projector and/or take the form of one or more peripheral computing systems that communicate with the head-mounted projector.

Computing system 700 includes a logic machine 701 and a storage machine 702. Head-mounted computing system 700 may optionally include a projection engine 703, optical stabilization subsystem 704, input subsystem 705, communication subsystem 706, and/or other components not shown in FIG. 7.

Logic machine 701 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 702 includes one or more physical devices configured to hold instructions executable by the logic machine to implement the methods and processes described herein. When such methods and processes are implemented, the state of storage machine 802 may be transformed—e.g., to hold different data.

Storage machine 702 may include removable and/or built-in devices. Storage machine 702 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 802 may include volatile, nonvolatile, dynamic, static, read/write, read-only, random-access, sequential-access, location-addressable, file-addressable, and/or content-addressable devices.

It will be appreciated that storage machine 702 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 701 and storage machine 702 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, projection engine 703 may be used to present a visual representation of data held by storage machine 702. This visual representation may take the form of a graphical user interface (GUI). As the herein described methods and processes change the data held by the storage machine, and thus transform the state of the storage machine, the state of projection engine 703 may likewise be transformed to visually represent changes in the underlying data. Projection engine 703 may include one or more visual light projectors utilizing virtually any type of technology. Such display devices may be combined with logic machine 701 and/or storage machine 702 in a shared enclosure, or projection engine may take the form of a head-mounted device that is in communication with one or more peripheral enclosures configured to house logic machine 701 and storage machine 702. Projection engine 703 may be further coupled to optical stabilization subsystem 704. Optical stabilization subsystem 704 may impart control over the shape, size, and projection direction of images emanating from projection engine 703 as described herein. Optical stabilization subsystem 704 may be completely or partially co-housed with projection engine 703 in a shared enclosure. Optical stabilization subsystem 704 may control aspects of projection engine 703 in response to commands received from logic machine 701.

When included, input subsystem 705 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 706 may be configured to communicatively couple computing system 700 with one or more other computing devices. Communication subsystem 706 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

An example provides a display system comprising a head-mounted projector including an exit aperture, and a projection engine to project image light through the exit aperture. In such an example, the display system may comprise a retro-reflective display that reflects image light in a first dimension at above 90% efficiency within a 25 degree exit angular spread and reflects image light in the first dimension below 10% efficiency outside of a 35 degree exit angular spread. In such an example, the retro-reflective display may additionally or alternatively include a diffuser layer adhered to a retro-reflective film. In such an example, the diffuser layer may additionally or alternatively be characterized by a top-hat type diffusion profile. In such an example, the diffuser layer may additionally or alternatively include a graded index diffuser. In such an example, the diffuser layer may additionally or alternatively include a substantially one-dimensional surface relief diffuser, and the retro-reflective display may additionally or alternatively diffuse light in the first dimension, and may additionally or alternatively substantially retro-reflect image light without diffusion in a second dimension, perpendicular to the first dimension. In such an example, the display system may additionally or alternatively comprise a frame, and the frame may additionally or alternatively mount the exit aperture horizontally on an outside of a user's eyes. In such an example, the projection engine may additionally or alternatively have a field of projection and may additionally or alternatively auto-crop the field of projection to avoid projecting outside boundaries of the retro-reflective display. In such an example, the display system may additionally or alternatively comprise an optical stabilization subsystem configured to adjust the auto-cropping of the field of projection responsive to the retro-reflective display moving within the field of projection. In such an example, the optical stabilization subsystem may additionally or alternatively be configured to adjust a projection direction of the projection engine by physically moving the projection engine relative to the retro-reflective display responsive to the retro-reflective display moving outside of the field of projection. In such an example, the optical stabilization subsystem may additionally or alternatively comprise a rotational motor coupled to the projection engine. In such an example, the display system may additionally or alternatively comprise one or more cameras to receive light reflected off of the retro-reflective display, and the optical stabilization subsystem may additionally or alternatively be configured to determine boundaries of the retro-reflective display based on the received light. In such an example, the optical stabilization subsystem may additionally or alternatively be configured to determine a size of the retro-reflective display based on the boundaries of the retro-reflective display, and may additionally or alternatively be configured to adjust auto-cropping of the field of projection based on the size of the retro-reflective display. In such an example, the display system may additionally or alternatively comprise one or more IR LEDs. In such an example, the display system may additionally or alternatively comprise an input subsystem to determine the position of one or more objects on or near the retro-reflective display based on IR light received by the one or more cameras. In such an example, the projection engine may additionally or alternatively be configured to mask the one or more objects from the projected image light. In such an example, the retro-reflective display may additionally or alternatively be a foldable display. Any or all of the above-described examples may be combined in any suitable manner in various implementations.

Another example provides a method for a display system, the method comprising receiving boundaries of a retro-reflective display relative to a field of projection of a projection engine, auto-cropping the field of projection to avoid projecting outside the boundaries of the retro-reflective display, and dynamically adjusting the auto-cropping of the field of projection responsive to movement of the retro-reflective display within of the field of projection. In such an example, the method may additionally or alternatively comprise dynamically adjusting a projection direction of the projection engine by physically moving the projection engine relative to the retro-reflective display responsive to one or more boundaries of the retro-reflective display moving outside of the field of projection. In such an example, receiving boundaries of a retro-reflective display may additionally or alternatively comprise receiving IR light retro-reflected off of the retro-reflective display at one or more cameras. In such an example, the method may additionally or alternatively comprise determining a position of one or more objects located between the retro-reflective display and the projection engine based on IR light received by the one or more cameras; and may additionally or alternatively comprise masking the one or more objects on or near the retro-reflective display from image light projected by the projection engine. Any or all of the above-described examples may be combined in any suitable manner in various implementations.

Yet another example provides a display system, comprising a head-mounted projector, including an exit aperture, a projection engine to project image light within a field of projection through the exit aperture, a frame to mount the exit aperture horizontally on an outside of a user's eyes. In such an example, the display system may additionally or alternatively comprise a retro-reflective display including a graded index diffuser adhered to a retro-reflective film such that the retro-reflective display reflects image light with a top-hat type diffusion profile, and may additionally or alternatively comprise an optical stabilization subsystem to adjust auto-cropping of image light within the field of projection responsive to the retro-reflective display moving within the field of projection. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display system, comprising:
    a head-mounted projector, including:
        an exit aperture, and
        a projection engine to project image light through the exit aperture; and
    a retro-reflective display that reflects image light in a first dimension at above 90% efficiency within a 25 degree exit angular spread and reflects image light in the first dimension below 10% efficiency outside of a 35 degree exit angular spread.

2. The display system of claim 1, wherein the retro-reflective display includes a diffuser layer adhered to a retro-reflective film.

3. The display system of claim 2, wherein the diffuser layer is characterized by a top-hat type diffusion profile.

4. The display system of claim 3, wherein the diffuser layer includes a graded index diffuser.

5. The display system of claim 2, wherein the diffuser layer includes a substantially one-dimensional surface relief diffuser, and where the retro-reflective display diffuses light in the first dimension, and substantially retro-reflects image light without diffusion in a second dimension, perpendicular to the first dimension.

6. The display system of claim 2, further comprising a frame, wherein the frame mounts the exit aperture horizontally to an outside of a user's eyes.

7. The display system of claim 1, wherein the projection engine has a field of projection and auto-crops the field of projection to avoid projecting outside boundaries of the retro-reflective display.

8. The display system of claim 7, further comprising an optical stabilization subsystem configured to adjust the auto-cropping of the field of projection responsive to the retro-reflective display moving within the field of projection.

9. The display system of claim 8, where the optical stabilization subsystem is further configured to adjust a projection direction of the projection engine by physically moving the projection engine relative to the retro-reflective display responsive to the retro-reflective display moving outside of the field of projection.

10. The display system of claim 9, where the optical stabilization subsystem comprises a rotational motor coupled to the projection engine.

11. The display system of claim 8, further comprising one or more cameras to receive light reflected off of the retro-reflective display, and where the optical stabilization subsystem is configured to determine boundaries of the retro-reflective display based on the received light.

12. The display system of claim 11, where the optical stabilization subsystem is configured to determine a size of the retro-reflective display based on the boundaries of the retro-reflective display, and further configured to adjust auto-cropping of the field of projection based on the size of the retro-reflective display.

13. The display system of claim 11, further comprising:
one or more IR LEDs; and
an input subsystem to determine the position of one or more objects on or near the retro-reflective display based on IR light received by the one or more cameras.

14. The display system of claim 13, where the projection engine is further configured to mask the one or more objects from the projected image light.

15. The display system of claim 1, where the retro-reflective display is a foldable display.

16. A method for a display system, comprising:
receiving boundaries of a retro-reflective display relative to a field of projection of a projection engine;
auto-cropping the field of projection to avoid projecting outside the boundaries of the retro-reflective display; and
dynamically adjusting the auto-cropping of the field of projection responsive to movement of the retro-reflective display within of the field of projection.

17. The method of claim 16, further comprising:
dynamically adjusting a projection direction of the projection engine by physically moving the projection engine relative to the retro-reflective display responsive to one or more boundaries of the retro-reflective display moving outside of the field of projection.

18. The method of claim 16, where receiving boundaries of a retro-reflective display further comprises:
at one or more cameras, receiving IR light retro-reflected off of the retro-reflective display.

19. The method of claim 18, further comprising:
determining a position of one or more objects located between the retro-reflective display and the projection engine based on IR light received by the one or more cameras; and
masking the one or more objects on or near the retro-reflective display from image light projected by the projection engine.

20. A display system, comprising:
a head-mounted projector, including:
an exit aperture;
a projection engine to project image light within a field of projection through the exit aperture; and
a frame to mount the exit aperture horizontally to an outside of a user's eyes;
a retro-reflective display including a graded index diffuser adhered to a retro-reflective film such that the retro-reflective display reflects image light with a top-hat type diffusion profile; and
an optical stabilization subsystem to adjust auto-cropping of image light within the field of projection responsive to the retro-reflective display moving within the field of projection.

* * * * *